C. H. LARSSON.
SEED DRILL.
APPLICATION FILED NOV. 7, 1913.
1,218,421.
Patented Mar. 6, 1917.
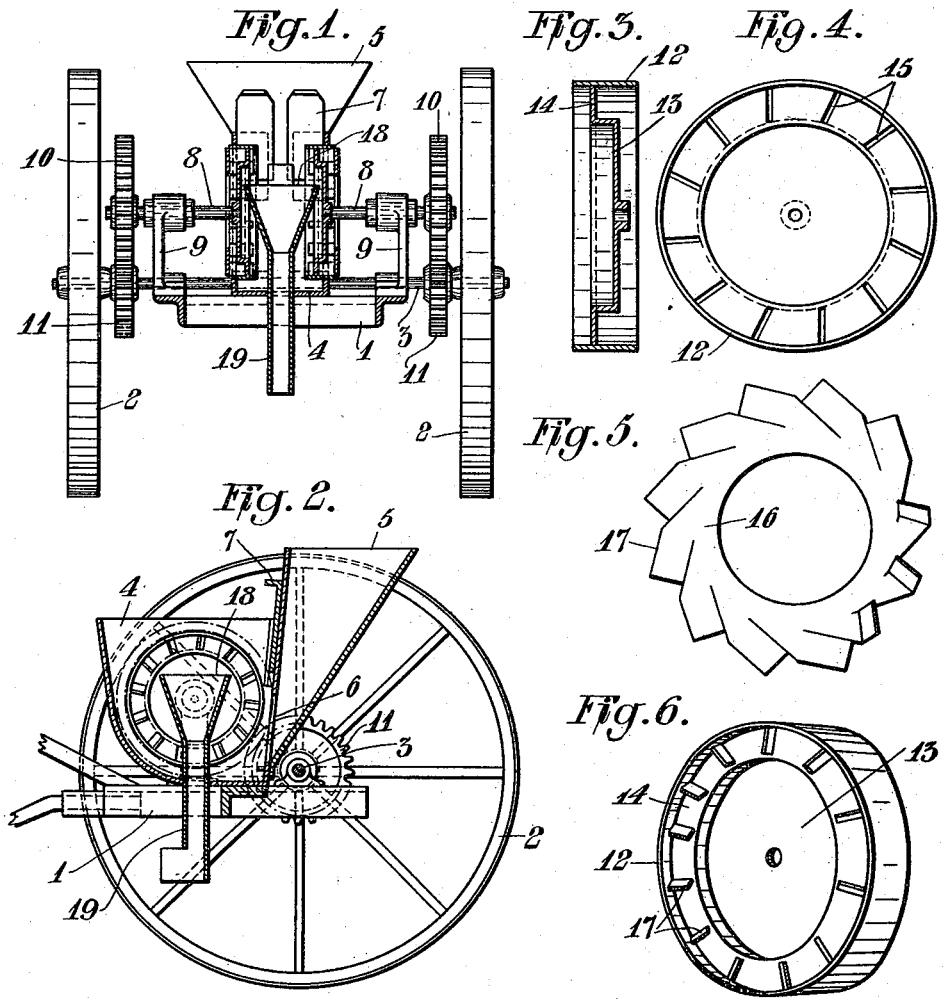
Witnesses:
Inventor:
Carl Herman Larsson.

UNITED STATES PATENT OFFICE.

CARL HERMAN LARSSON, OF TYCKLINGEN, NEAR VADSTENA, SWEDEN.

SEED-DRILL.

1,218,421.	Specification of Letters Patent.	Patented Mar. 6, 1917.

Application filed November 7, 1913. Serial No. 799,656.

*To all whom it may concern:*

Be it known that I, CARL HERMAN LARSSON, a subject of the King of Sweden, residing at Tycklingen, near Vadstena, in the Kingdom of Sweden, have invented new and useful Improvements in Seed-Drills, of which the following is a specification, reference being had to the drawing accompanying and forming a part thereof.

My invention relates to improvements in seed-drills of the class in which the feeding of the sowing-seed out of the drill-box is effected by means of ladles or spoons located on rotating wheels so arranged in the side-walls of the box that the ladles, upon rotation of the wheels, move upward and across the upper end or ends of the outlet pipe opening in the middle part of the box and leading to the share of the drill.

The object of my invention is to provide a machine, by means of which the quantity of the seed fed out of the box may be effectively regulated for various kinds of seeds. For this purpose I provide two wheels feeding the seed into a common outlet pipe and connected to separate shafts, which may be driven at different variable speeds, that is to say, one or both of them may be driven at a lower or a higher rate of speed according to the quantity of seed desired to be fed out of the machine.

In the accompanying drawing Figure 1 is an elevation of a seed drill constructed according to my invention, the drill-box and feeding wheels being shown in section. Fig. 2 is a vertical longitudinal section of the seed drill. Fig. 3 shows a section and Fig. 4 a side view of one part of a feeding wheel, and Fig. 5 is a side view of the other part of the feeding wheel. Fig. 6 is a perspective view of an assembled feeding wheel.

The frame 1 of the seed drill is supported on the wheels 2 secured to the shaft 3 journaled in the frame. To the frame 1 the drill box 4 is secured which is connected with a seed hopper 5 through apertures 6 controlled by means of lids 7. In openings in the side walls of the drill box 4 the feeding wheels are fitted closely, thus preventing the seed from falling out. The feeding wheels are mounted on ends of shafts 8 journaled in frame brackets or standards 9 and having gears 10 meshing with gear-wheels 11 on the shaft 3. When moving the seed drill the feeding wheels will thus be rotated from the wheels 2. By removing the gears 10 and 11 and exchanging the same for other gears of different sizes the speed of the feeding wheels may be varied as desired.

Each feeding wheel consists of two parts adjustable relatively to each other. The outer part (see Figs. 3 and 4) consists of a cylindrical rim 12 attached to disk the central portion 13 of which is depressed and provided with suitable means for being secured to the end of a shaft 8. The annular portion 14 encircling the depressed portion 13 is provided with a number of slots 15 extending from the edge of the depressed portion 13 to the rim 12 at an acute angle to the radius. The other part of the feeding wheel (Fig. 5) consists of a plate 16 in the edge of which tongues 17 are cut out, the number and width of which correspond to the number and length of the slots 15 in the outer part. These tongues are then bent up in an angle to the plate 16, so that the two parts of the feeding wheel may be assembled by inserting the tongues 17 in the slots 15 in the annular portion 14, as shown in Fig. 6. There will thus be formed pockets between the tongues 17, the wall or portion 14 and the rim 12, in which pockets the seed will collect when the wheels are rotated. The size of these pockets may be varied to suit the kind of seed to be sown by forcing the tongues more or less through the slots.

When the feeding wheels are placed in position in the openings in the walls of the drill box 4 on the shafts 8 (Figs. 1 and 2), the upper end or funnel 18 of the outlet pipe 19 extends into the depressed portions 13 of the feeding wheels, so that the seed gathered in the pockets in the wheels, when falling out of said pockets at the highest point of the wheel, will fall down into the funnel 18.

By exchanging the gears 10, 11 and by adjustment of the size of the pockets in the feeding wheels a very exact regulation may be effected for sowing various kinds of seeds.

I claim:

In a seed drill, the combination of a drill box, and feed-wheels arranged to rotate in apertures in said drill box, each feed-wheel consisting of a flanged disk provided with slots and another disk provided with tongues cut out in the same and bent up in an angle to the disk which tongues are sliding in and projecting through said slots and forming pockets with the flange of the first-named disk, substantially as and for the purpose set forth.

CARL HERMAN LARSSON.

Copies of this patent may be obtained for five cents each, by addressing the "Commissioner of Patents, Washington, D. C."